No. 764,946. PATENTED JULY 12, 1904.
R. HUGHES.
ICE HOOK.
APPLICATION FILED JAN. 23, 1904.
NO MODEL.
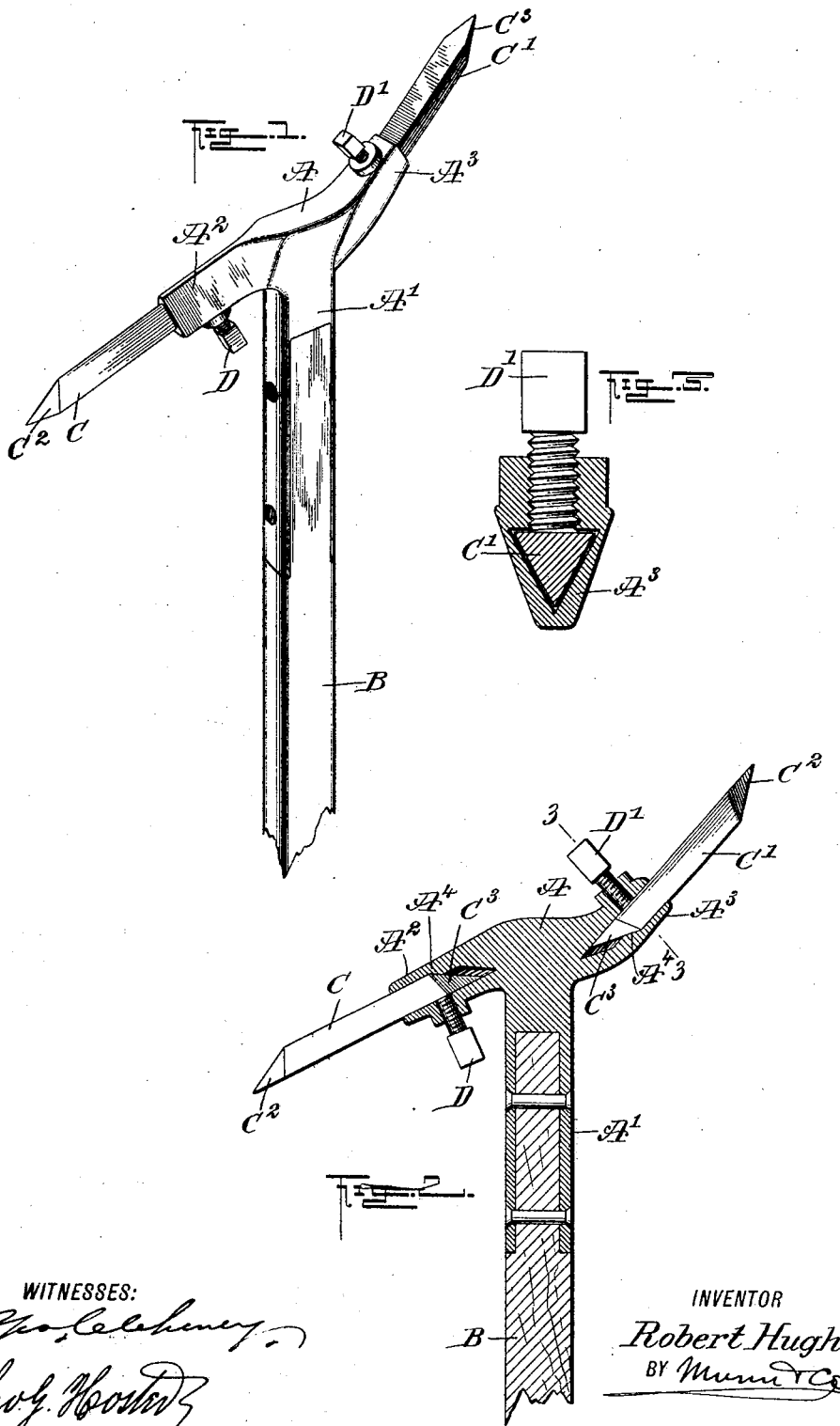
WITNESSES:
INVENTOR
Robert Hughes
BY Munn & Co
ATTORNEYS No. 764,946. Patented July 12, 1904.

UNITED STATES PATENT OFFICE.

ROBERT HUGHES, OF MOUNT VERNON, NEW YORK.

ICE-HOOK.

SPECIFICATION forming part of Letters Patent No. 764,946, dated July 12, 1904.

Application filed January 23, 1904. Serial No. 190,401. (No model.)

*To all whom it may concern:*

Be it known that I, ROBERT HUGHES, a citizen of the United States, and a resident of Mount Vernon, in the county of Westchester and State of New York, have invented a new and Improved Ice-Hook, of which the following is a full, clear, and exact description.

The object of the invention is to provide a new and improved ice-hook for use in ice-harvesting, in ice-houses, and other places, and arranged to permit convenient pushing and pulling of the ice blocks, to allow of readily changing and grinding the points in case one becomes dull, and to prevent the fastening devices for the points from being injured when the ice-hook is thrown down.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a sectional side elevation of the same, and Fig. 3 is an enlarged cross-section of the same on the line 3 3 in Fig. 2.

The head A of the ice-hook is provided with a suitable integral shank $A'$, on which is fastened a handle B, taken hold of by the operator for manipulating the ice-hook, as hereinafter more fully described. From the head A extend sockets $A^2$ and $A^3$, the one extending forwardly at a sharp angle from one side of the handle and the other extending rearwardly at an angle less sharp from the opposite side of the handle.

The sockets $A^2$ and $A^3$ are adapted to receive removable and reversible points C and $C'$, triangular in cross-section and each having pointed terminals $C^2$ and $C^3$, either one of which can be put into active use—that is, when one pointed terminal becomes dull the point C or $C'$ is removed from the socket and reversed to make use of the other pointed terminal. Set-screws D and $D'$, screwing in the sockets $A^2$ and $A^3$, serve to fasten the points C and $C'$ in position in the sockets, it being understood that each point extends with one terminal into the corresponding socket, the opening of which corresponds to the shape of the points, and within each opening of a socket is a shoulder $A^4$, against which abuts a part of the point, so as to prevent the terminal from contacting with the inner end of the socket to protect the terminal against injury when the ice-hook is used. The set-screws D and $D'$ extend in a plane passing through the sockets, the point C, the head A, and the handle B, as will be readily understood by reference to the drawings, so that the outer ends of the set-screws are protected against injury in case the operator throws the hook flat down onto the ice or onto the ground. Hence when the operator has hold of the handle B he can conveniently engage the point C with the ice block, so as to readily pull the same along; but when it is desired to push the ice block then the tool is reversed and the point $C'$ is engaged with the ice-block.

In case the outer terminal of a point C or $C'$ becomes dull then the operator by simply unscrewing the corresponding set-screw D or $D'$ can remove the point and reverse the same, so as to again render the tool ready for service after fastening the point in place by screwing up the corresponding set-screw.

If desired, the points C and $C'$ can be interchanged in the sockets $A^2$ and $A^3$, and as the points shown and described are very simple and do not take up much space it is evident that the operator can carry one or more surplus points along, so as to use the same in case the points in the tool become unserviceable.

Having thus described my invention, I claim as new and desire to secure by Letters Patent—

1. An ice-hook having a handled head formed with point-sockets in the same plane one extending forwardly at a sharp angle from one side of the head and the other rearwardly at an angle less sharp, and removable and reversible points for the said sockets the shanks of said points being triangular in cross-section and beveled at their ends on two sides to form a terminal point central of the other side, each socket having an interior shoulder, in advance of its bottom, for said beveled faces to abut against, to prevent the inner terminals of the points from coming in contact with the inner ends of the sockets and means for securing the points in the sockets, as set forth.

2. An ice-hook having a handled head formed with point-sockets triangular in cross-section in the same plane, one extending forwardly at a sharp angle from one side of the handle, and the other extending rearwardly at an angle less sharp, from the opposite side of the handle, removable and reversible points for said sockets, the shanks of said points being triangular in cross-section, and beveled at their ends on two sides to form a terminal point central of the other side, and set-screws screwing in the sockets for fastening the points in place, the said screws extending in the same plane with the sockets and engaging one of the triangular faces of the points at right angles thereto.

In testimony whereof I have signed my name to this specification in the presence of two subscribing witnesses.

ROBERT HUGHES.

Witnesses:
L. O. BATEMAN,
FRANCIS E. HAAG.